(12) United States Patent
Barton

(10) Patent No.: US 7,091,694 B1
(45) Date of Patent: Aug. 15, 2006

(54) REVOLVING BATTERY RESERVOIR SYSTEM

(76) Inventor: James C. Barton, 1658 Smyrna Rd., Keatchie, LA (US) 71046

( * ) Notice: Subject to any disclaimer, the term of this patent is extended or adjusted under 35 U.S.C. 154(b) by 79 days.

(21) Appl. No.: 10/893,422

(22) Filed: Jul. 16, 2004

(51) Int. Cl.
*H02J 7/00* (2006.01)

(52) U.S. Cl. ..................................... 320/110

(58) Field of Classification Search ............... 320/107, 320/110, 112, 116, 138; 307/64
See application file for complete search history.

(56) References Cited

U.S. PATENT DOCUMENTS

| | | | | |
|---|---|---|---|---|
| 4,644,451 A | * | 2/1987 | Chabria | 362/189 |
| 4,985,812 A | * | 1/1991 | Uke | 362/158 |
| 5,489,486 A | * | 2/1996 | Glover | 429/100 |
| 5,660,458 A | * | 8/1997 | Chabria | 362/189 |
| 5,709,964 A | * | 1/1998 | Christensen et al. | 429/153 |
| 5,909,062 A | * | 6/1999 | Krietzman | 307/64 |
| 5,911,497 A | * | 6/1999 | Mele | 362/202 |
| 6,046,572 A | * | 4/2000 | Matthews et al. | 320/116 |
| 6,062,702 A | * | 5/2000 | Krietzman | 362/158 |
| 6,616,300 B1 | * | 9/2003 | Hrabal | 362/258 |
| 6,709,129 B1 | * | 3/2004 | Galli | 362/206 |
| 6,851,828 B1 | * | 2/2005 | Hansen | 362/203 |
| 2003/0035286 A1 | * | 2/2003 | Parker et al. | 362/205 |

* cited by examiner

*Primary Examiner*—Karl Easthom
*Assistant Examiner*—Samuel Berhanu
(74) *Attorney, Agent, or Firm*—R. Keith Harrison

(57) ABSTRACT

A revolving battery reservoir system is disclosed. The revolving battery reservoir system includes a system housing for containing multiple sets of batteries. A housing cap is rotatably mounted on the system housing. A contact rod is provided on the housing cap for contacting a selected one of the multiple sets of batteries responsive to rotation of the housing cap on the system housing. Multiple battery extension springs are provided in the system housing for engaging the multiple sets of batteries, respectively. An electrical device is provided in electrical contact with the multiple battery extension springs and the contact rod.

17 Claims, 5 Drawing Sheets

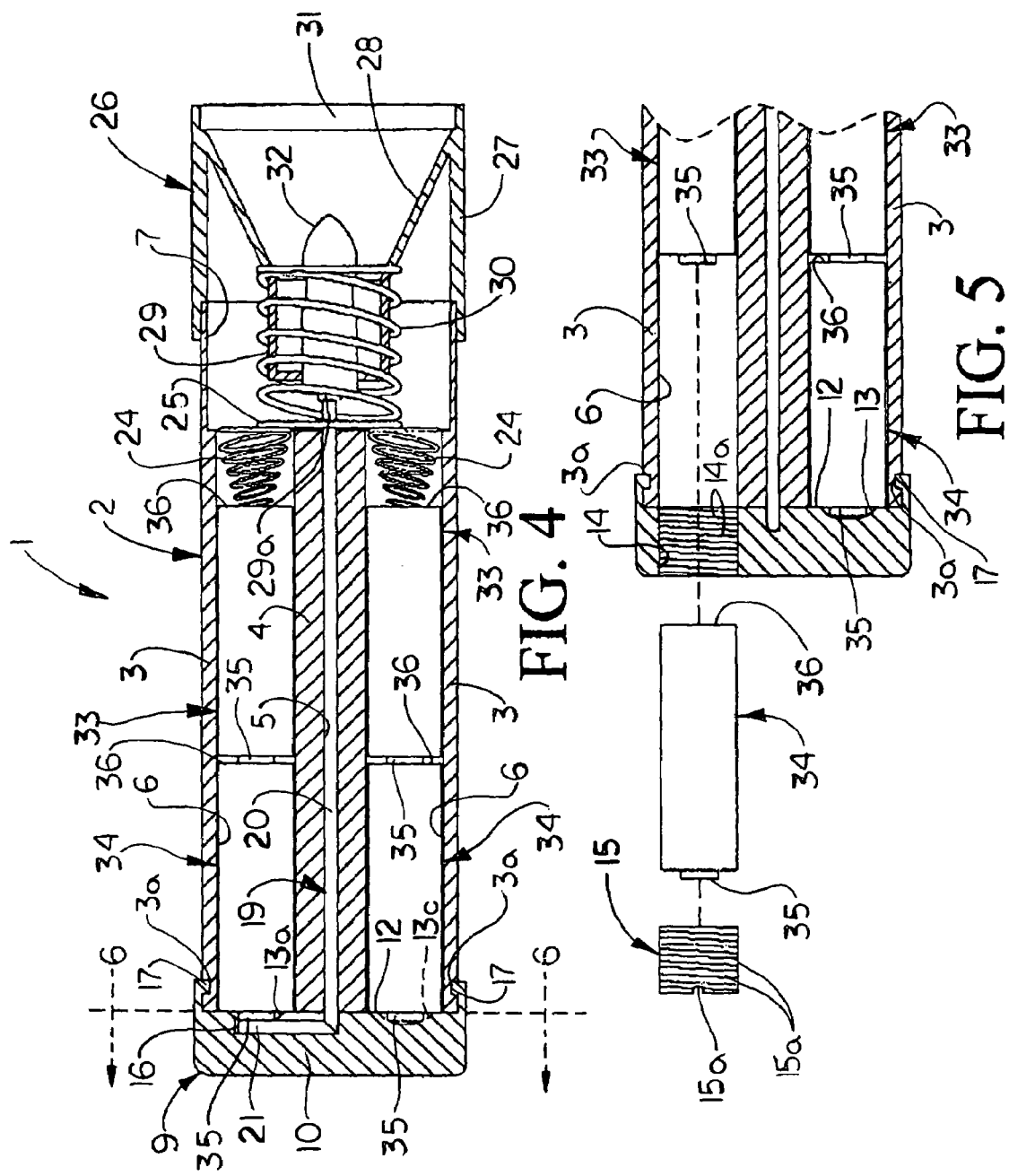

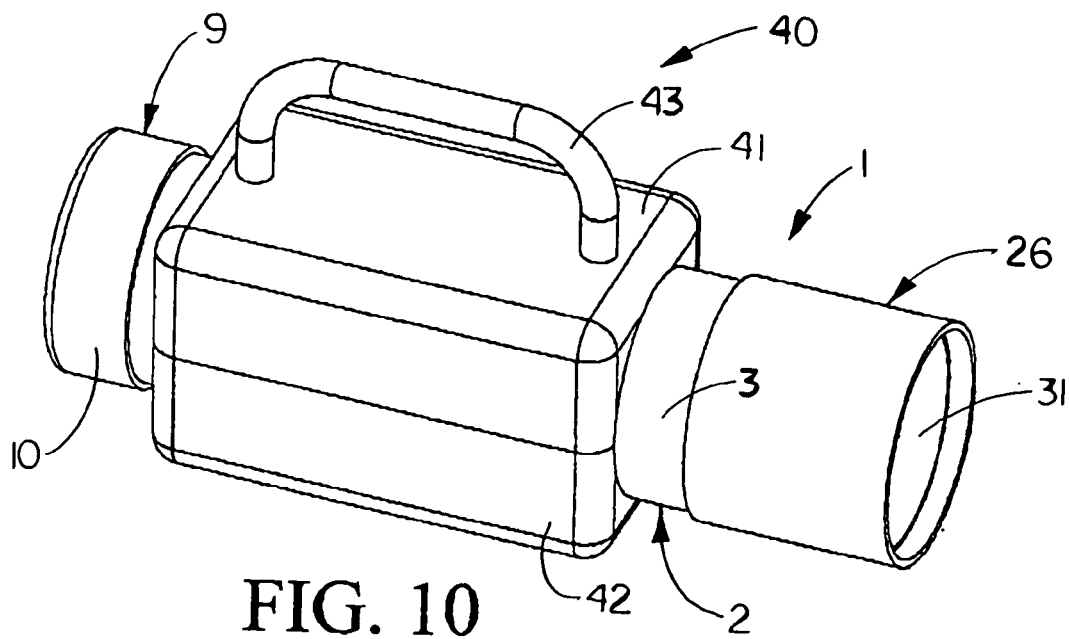
FIG. 10
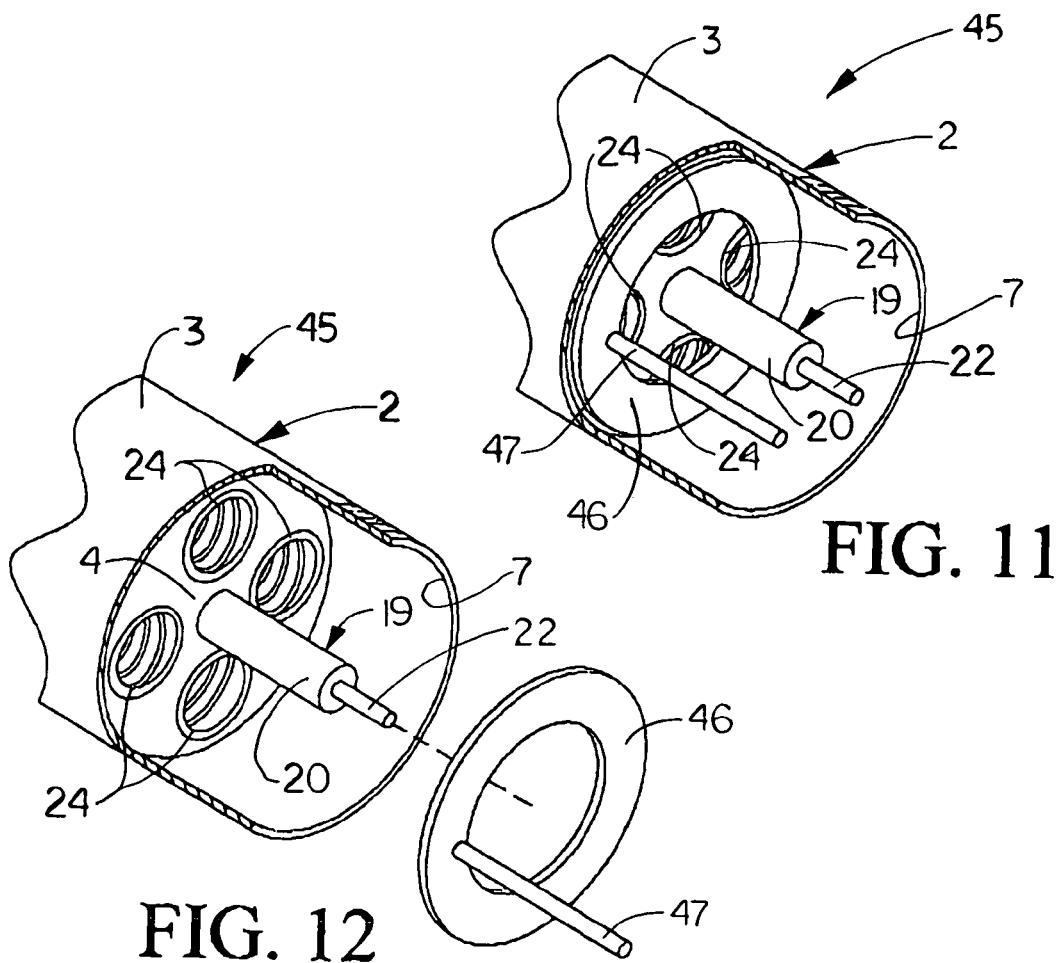
FIG. 11
FIG. 12

US 7,091,694 B1

REVOLVING BATTERY RESERVOIR SYSTEM

FIELD OF THE INVENTION

The present invention relates to battery-powering systems for flashlights and other electrical devices. More particularly, the present invention relates to a revolving battery reservoir system including multiple sets of batteries which can be sequentially selected to power an electrical device without the need for immediate replacement of expended batteries.

BACKGROUND OF THE INVENTION

Flashlights, radios and other electrical devices frequently require the use of portable electrical supplies in the form of batteries. When the batteries are expended, they must be replaced. This requirement may introduce considerable delay between the time the batteries are expended and the time replacement batteries become available. Furthermore, electrical devices typically do not include a mechanism for indicating the remaining lifetime of the batteries which power the device, frequenlty resulting in expending of the batteries at an inconveninent time.

Therefore, a battery reservoir system is needed which enables a user of an electrical device to select among multiple sets of batteries to power the device when one of the battery sets is consumed.

SUMMARY OF THE INVENTION

The present invention is generally directed to a revolving battery reservoir system which enables a user of a flashlight or other electrical device to sequentially select among multiple sets of batteries to power the device such that after one set of batteries is consumed, a fresh set of batteries contained within the system can be used to power the device. The revolving battery reservoir system includes a system housing for containing multiple sets of batteries. A housing cap is rotatably mounted on the system housing. A contact rod is provided on the housing cap for contacting a selected one of the multiple sets of batteries responsive to rotation of the housing cap on the system housing. Multiple battery extension springs are provided in the system housing for engaging the multiple sets of batteries, respectively. An electrical device, such as a lightbulb, for example, is provided in electrical contact with the multiple battery extension springs and the contact rod.

BRIEF DESCRIPTION OF THE DRAWINGS

The invention will now be described, by way of example, with reference to the accompanying drawings, in which:

FIG. 4 is a longitudinal sectional view, taken along section lines 4—4 in FIG. 1, of the revolving battery reserve system;

FIG. 5 is a sectional view, taken along section lines 5—5 in FIG. 2, of the housing element of the revolving battery reserve system;

FIG. 10 is a perspective view of the revolving battery reserve system, illustrating a self-standing handle assembly attached to the system;

FIG. 11 is a rear perspective view (partially in section) of an all-purpose embodiment of the revolving battery reserve system; and FIG. 12 is an exploded, rear perspective view (partially in section) of the all-purpose revolving battery reserve system of FIG. 11.

DETAILED DESCRIPTION OF THE INVENTION

Figure 1:
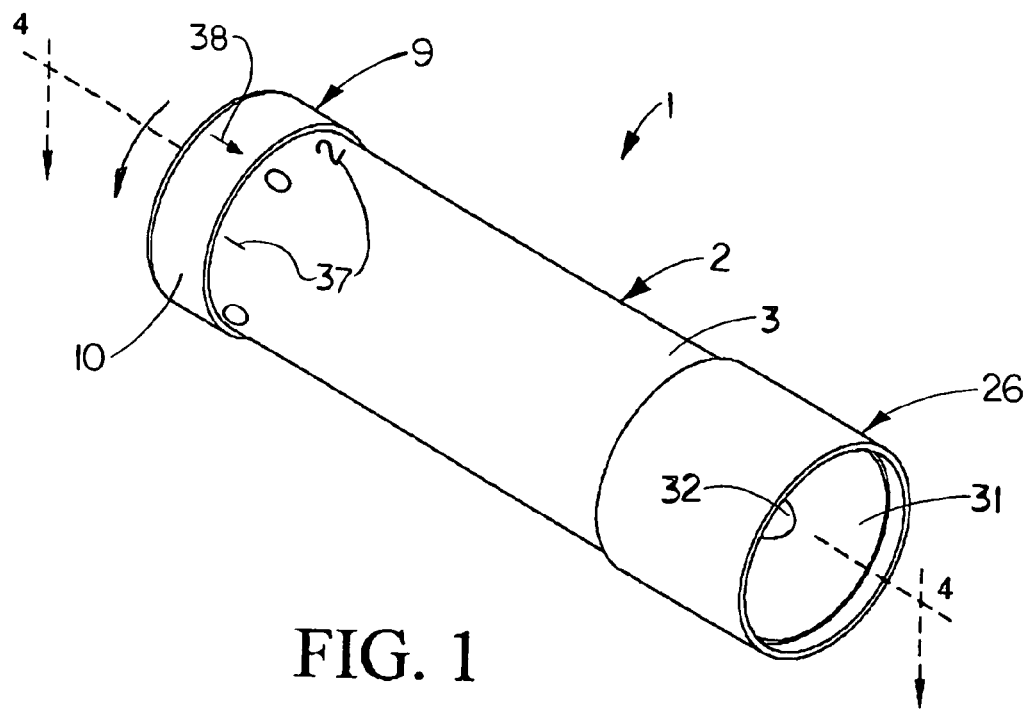
FIG. 1 is a front perspective view of an illustrative flashlight embodiment of a revolving battery reservoir system according to the present invention.

Referring initially to FIGS. 1–9 of the drawings, an illustrative embodiment of the revolving battery reserve system, hereinafter system, of the present invention is generally indicated by reference numeral 1. The system 1 includes an elongated, typically cylindrical system housing 2 having a body 3 through which extends multiple, adjacent battery cavities 6, as illustrated in FIG. 4. Each of the battery cavities 6 is adapted to receive a pair or set of multiple batteries, such as an interior battery 33 and an exterior battery 34, for example, each having a positive pole 35 and a negative pole 36. A central core 4 extends through the center of the system housing 2 and separates the battery cavities 6 from each other. A rod cavity 5, the purpose of which will be hereinafter described, extends through the core 4.

Figure 2:
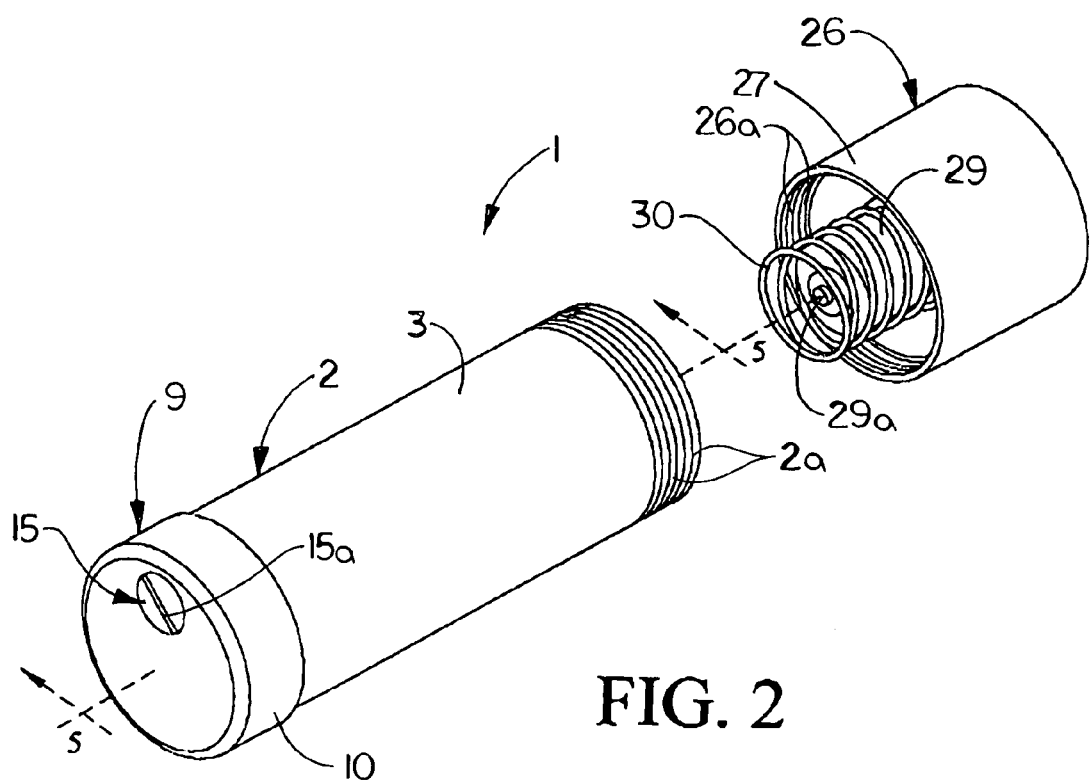
FIG. 2 is an exploded, rear perspective view of the revolving battery reservoir system, illustrating removable attachment of a flashlight bulb housing to the housing element of the system.

As illustrated in FIG. 2, a flashlight bulb housing 26 is removably attached to one end of the housing 2. Accordingly, housing threads 26a may be provided inside a cylindrical housing wall 27 of the flashlight bulb housing 26 for removably engaging exterior housing threads 2a on the system housing 2. As illustrated in FIG. 4, the flashlight bulb housing 26 typically includes a reflective surface 28 extending from the housing wall 27; a transparent lens 31 adjacent to the reflective surface 28; a bulb socket 29 extending rearwardly from the reflective surface 28; a flashlight bulb 32 having a positive contact 29a seated in the bulb socket 29; and a bulb spring 30 provided in electrical contact with the bulb socket 29.

As further illustrated in FIG. 4, a recess 7 provided in one end of the system housing 2 accommodates the bulb socket 29 when the flashlight bulb housing 26 is attached to the system housing 2. The bulb spring 30 engages a negative contact ring 25 which is seated against the core 4 of the system housing 2, inside the recess 7. A battery extension spring 24 provided in each battery cavity 6 contacts the negative contact ring 25.

Figure 3:
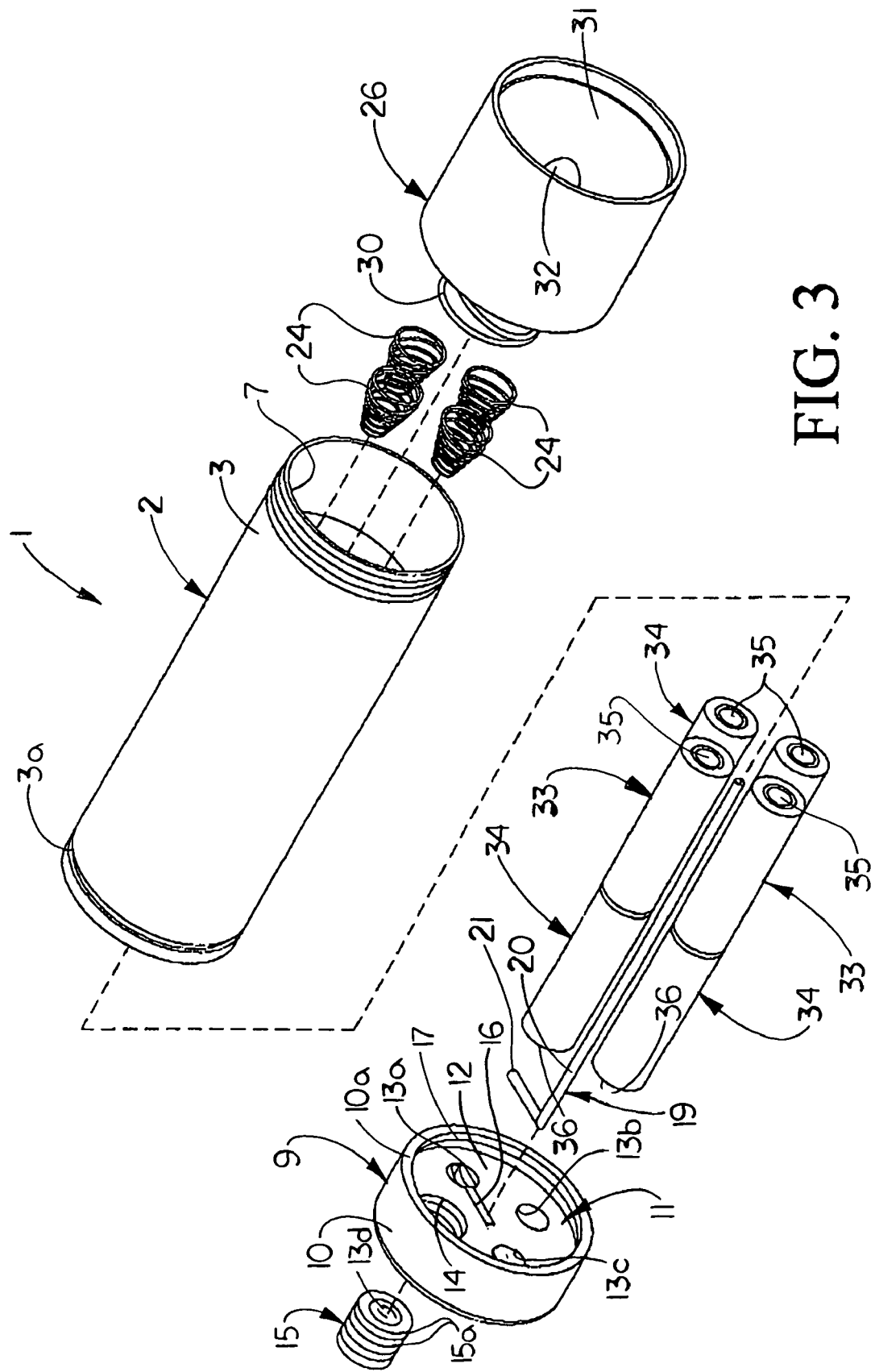
FIG. 3 is an exploded perspective view of the revolving battery reserve system, illustrating interior components of the system.

A housing cap 9 is rotatably attached to the end of the system housing 2 which is opposite the flashlight bulb housing 26. The housing cap 9 includes a cap body 10 and a circular cap wall 10a which extends from the cap body 10 and defines a cap interior 11. The housing cap 9 includes a cap interior surface 12 in the cap interior 11, as illustrated in FIG. 3. Multiple, spaced-apart battery depressions 13a, 13b and 13c, respectively, are provided in the cap interior surface 12. As illustrated in FIGS. 3 and 4, a contact rod groove 16, the purpose of which will be hereinafter described, is provided in the cap interior surface 12 and communicates with the battery depression 13a. An annular mount flange 17 typically extends inwardly from the cap wall 10a and is seated in a circumferential cap groove 3a provided in the exterior surface of the system housing 3 to rotatably mount the housing cap 9 on the system housing 3, as illustrated in FIG. 4.

A plug opening 14 extends through the cap body 10, between the battery depressions 13a, 13c for the purpose of inserting each interior battery 33 and exterior battery 34 in the corresponding battery cavity 6 and removing the expended interior batteries 33 and exterior batteries 34 from the battery cavities 6, as illustrated in FIG. 5. The plug opening 14 is sealed by a removable battery plug 15 which may be provided with exterior plug threads 15b for threadibly engaging companion opening threads 14a inside the plug opening 14. A slot 15a may be provided in the exterior surface of the battery plug 15 to facilitate clockwise or counterclockwise rotation of the battery plug 15 in the plug opening 14. Alternatively, the battery plug 15 may be friction-fitted inside the plug opening 14, in which case the slot 15a may be omitted. As illustrated in FIG. 3, a battery depression 13d is provided in the interior surface of the battery plug 15.

Figures 7A, 8:
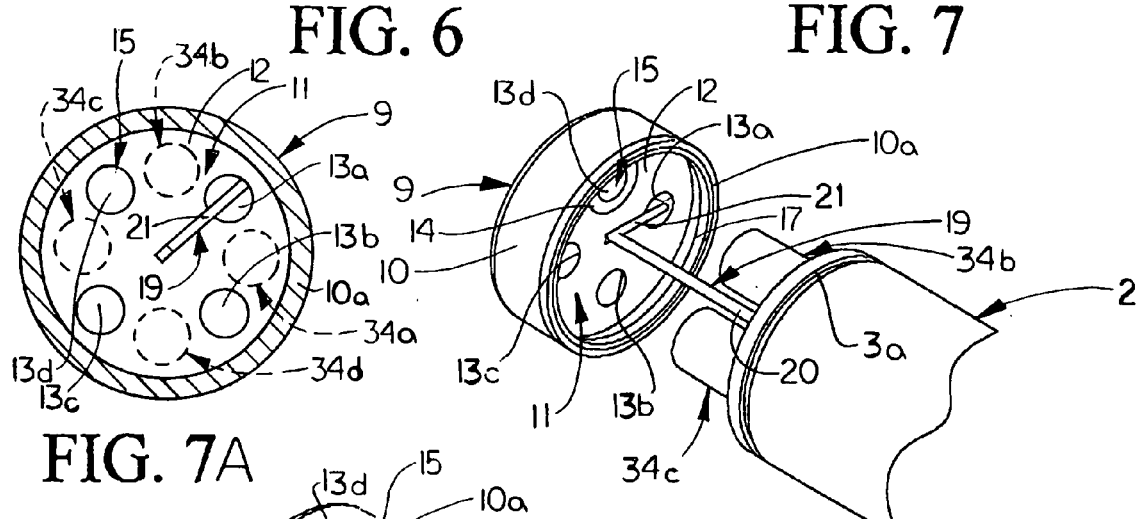
FIG. 7A is a cross-sectional view, taken along section line 7—7 in FIG. 4, of the housing cap element of the revolving battery reserve system, illustrating positioning of the housing cap in an "off" position to extinguish the flashlight bulb.
FIG. 8 is an exploded, perspective view, partially in section, of the housing element of the revolving battery reserve system, illustrating removal of the housing cap from the housing and positioning of the positive contact rod with respect to the housing cap.
Figure 9:
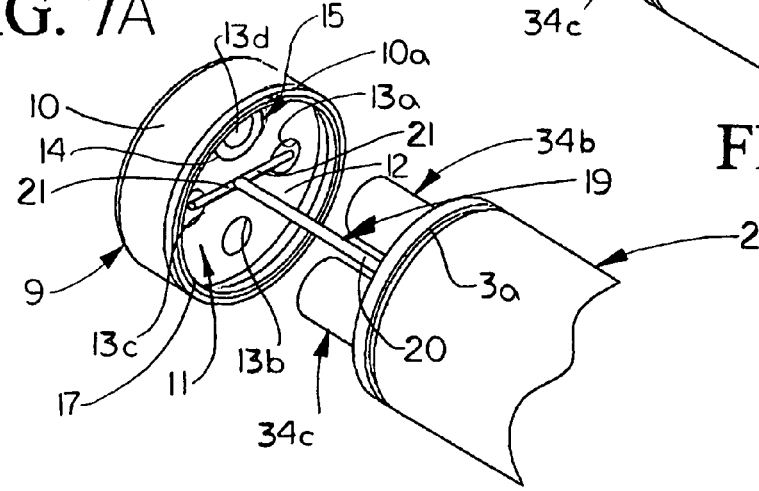
FIG. 9 is an exploded, perspective view, partially in section, of the housing element of the revolving battery reserve system, illustrating removal of the housing cap from the housing and positioning of a positive contact rod of alternative configuration with respect to the housing cap.

A positive contact rod 19 includes an elongated extension segment 20 and a contact segment 21 which is disposed at a substantially 90-degree angle with respect to the extension segment 20. The extension segment 20 extends through the rod cavity 5 of the core 4. As illustrated in FIGS. 3, 4 and 8, the contact segment 21 of the positive contact rod 19 is seated in the contact rod groove 16 provided in the cap interior surface 12. In an alternative embodiment illustrated in FIG. 9, a pair of contact segments 21 extends from opposite sides of the extension segment 20 to connect two sets of batteries in parallel, for purposes which will be hereinafter described.

Figures 6, 7:
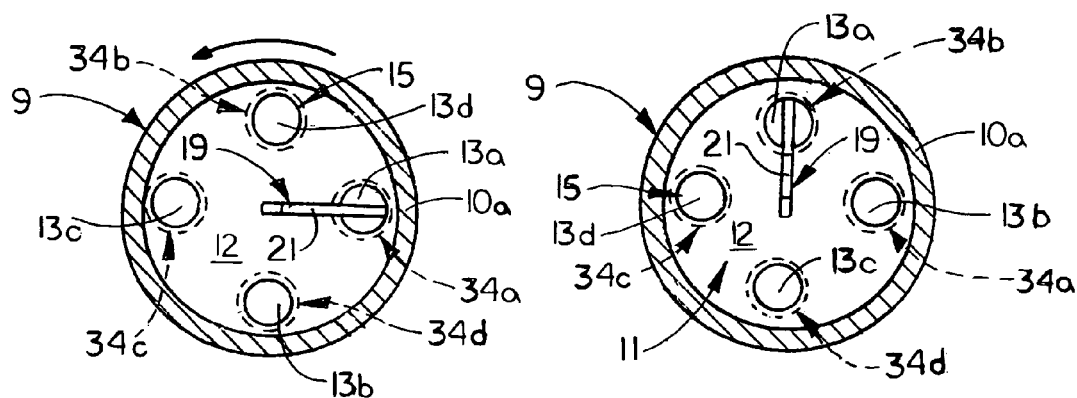
FIGS. 6 and 7 are cross-sectional views, taken along section line 6—6 in FIG. 4, of the housing cap element of the revolving battery reserve system, illustrating sequential selection of a pair of battery sets to power the flashlight bulb of the system.

As illustrated in FIG. 4, when an interior battery 33 and an exterior battery 34 are loaded into each battery cavity 6, the negative pole 36 of each interior battery 33 contacts the corresponding battery extension spring 24, whereas the positive pole 35 of each interior battery 33 contacts the negative pole 36 of the exterior battery 34. The positive pole 35 of each exterior battery 34 is biased by the corresponding battery extension spring 24 and interior battery 33 into one of the battery cavities 13a–13d. Accordingly, as illustrated in FIGS. 6–7A, upon rotation of the housing cap 9 on the system housing 2, the contact segment 21 of the positive contact rod 19, as well as the battery depressions 13a–13d, rotate with the housing cap 9 while the multiple battery sets including the exterior batteries 34a–34d, respectively, and corresponding interior batteries 33 remain stationary in the respective battery cavities 6 of the system housing 2. As illustrated in FIG. 4, the extending end of the extension segment 20 of the positive contact rod 19 is disposed in contact with the positive contact 29a of the light bulb 32.

As illustrated in FIGS. 6 and 7, the housing cap 9 can be rotated on the system housing 2 in such a manner that the contact segment 21 of the positive contact rod 19 engages the positive pole 35 of a selected one of the exterior batteries 34, which are designated by reference numerals 34a–34d in the respective battery pair sets contained in the battery cavities 6. Accordingly, in FIG. 6, the contact segment 21 is initially disposed in contact with the exterior battery 34a. As illustrated in FIG. 4, this establishes electrical contact between the positive contact 29a on the light bulb 32 and the positive pole 35 of the exterior battery 34a through the positive contact rod 19. Simultaneously, the battery extension spring 24, the negative contact ring 25 and the bulb spring 30 establish electrical contact between the negative pole 36 of the interior battery 33 of the battery pair and the bulb socket 29. This energizes the light bulb 32 through the interior battery 33 and corresponding exterior battery 34a. In the embodiment illustrated in FIG. 9, one of the contact segments 21 contacts the exterior battery 34a, whereas the other contact segment 21 contacts the exterior battery 34c. The contact segments 21 simultaneously contact the positive poles 35 of the exterior batteries 34a, 34c to prolong the availability of electrical power to the flashlight bulb 32 through the corresponding sets of batteries.

As illustrated in FIG. 7, by rotation of the housing cap 9 on the system housing 2, the contact segment 21 can be removed from contact with the positive pole 35 of the exterior battery 34a and brought into contact with the positive pole 35 of the exterior battery 34b. This energizes the light bulb 32 through the exterior battery 34b and corresponding interior battery 33, in the same manner as heretofore described with respect to the exterior battery 34a and corresponding interior battery 33. In the embodiment illustrated in FIG. 9, one of the contact segments 21 contacts the exterior battery 34b, whereas the other contact segment 21 contacts the exterior battery 34d. Continued rotation of the housing cap 9 of the embodiment of FIG. 8 brings the contact segment 21 into contact with the positive pole 35 of the exterior battery 34c, thereby energizing the light bulb 32 through the exterior battery 34c and corresponding interior battery 33. Finally, the housing cap 9 can be rotated to cause contact between the contact segment 21 and the positive pole 35 of the exterior battery 34d to energize the light bulb 32 through the exterior battery 34d and corresponding interior battery 33.

When the contact segment 21 contacts one of the exterior batteries 34a–34d to energize the light bulb 32, the positive pole 35 of each of the exterior batteries 34 snaps into a corresponding one of the battery depressions 13a–13d due to the bias exerted on each set of batteries by the corresponding battery extension spring 24. The system 1 is turned off and the light bulb 32 extinguished, as desired, by rotating the housing cap 9 in such a manner that the contact segment 21 is positioned between the exterior batteries 34a and 34b, respectively, as illustrated in FIG. 7A; the exterior batteries 34b and 34c, respectively; the exterior battery 34c and 34d, respectively; or the exterior batteries 34d and 34a, respectively. Thus, in the "off" position, the positive poles 35 of the exterior batteries 34 are positioned between the battery depressions 13a–13d and abut against the cap interior surface 12.

As illustrated in FIG. 1, markings or indicia 37 may be provided on the exterior surface of the system housing 2 to indicate the locations of the battery sets represented by the respective exterior batteries 34a–34d and corresponding interior batteries 33, as well as the "off" positions which correspond to the positions between the exterior batteries 34a–34d. Markings or indicia 38, such as an arrow, for example, may further be provided on the exterior surface of the housing cap 9 for alignment with the indicia 37 on the exterior surface of the system housing 2 to facilitate engagement of the contact segment 21 with the exterior batteries 34a–34d, respectively, and illumination of the light bulb 32, as well as to facilitate proper positioning of the housing cap 9 in the "off" position to turn off the light bulb 32, as desired.

Referring again to FIGS. 4–7A, in typical operation of the system 1, an interior battery 33 and an exterior battery 34 are initially inserted in each of the battery cavities 6 of the system housing 2, with the negative pole 36 of each interior battery 33 contacting a corresponding battery extension spring 24 and the positive pole 35 of the interior battery 33 contacting the negative pole 36 of the exterior battery 34, as illustrated in FIG. 4. Each interior battery 33 and exterior battery 34 pair is inserted into the corresponding battery cavity 6 by removing the battery plug 15 from the plug opening 14, aligning the plug opening 14 with the battery cavity 6 by rotating the housing cap 9 on the system housing 2, inserting the interior battery 33 and exterior battery 34 through the plug opening 14 and into the battery cavity 6, and replacing the battery plug 15 in the plug opening 14. When the system 1 is not used to illuminate the light bulb 32, the housing cap 9 is positioned such that the contact segment 21 of the positive contact rod 19 is located between adjacent exterior batteries 34 such as between the exterior batteries 34a and 34b, as illustrated in FIG. 7A, wherein the arrow or other indicia 38 on the exterior surface of the housing cap 9 is aligned with the appropriate "off" indicia 37 on the exterior surface of the system housing 2.

When it is desired to illuminate the light bulb 32, the housing cap 9 is rotated on the system housing 2 to bring the contact segment 21 into contact with the positive pole 35 of a selected one of the exterior batteries 34, such as the exterior battery 34a as illustrated in FIG. 6. Accordingly, the light bulb 32 is energized through the exterior battery 34a and the corresponding interior battery 33, as heretofore described with respect to FIG. 4. The light bulb 32 is turned off by rotating the housing cap 9 to position the contact segment 21 between the exterior batteries 34a and 34b, respectively, as illustrated in FIG. 7A. Throughout successive uses of the system 1 to illuminate the light bulb 32, the same set of batteries is typically used to energize the light bulb 32. Accordingly, the exterior battery 34a and corresponding interior battery 33 are typically used to energize the light bulb 32 until one or both of the exterior battery 34a and interior battery 33 are consumed. At that point, the housing cap 9 can be positioned in such a manner that the contact segment 21 contacts the positive pole 35 of the exterior battery 34b to illuminate the light bulb 32, as desired. The consumed exterior battery 34a and interior battery 33 can be removed from the battery cavity 6 through the plug opening 14, as desired.

After the exterior battery 34b and corresponding interior battery 33 have been consumed, the housing cap 9 can be rotated to cause contact between the contact segment 21 and the positive pole 35 of the exterior battery 34c to illuminate the light bulb 32. The consumed exterior battery 34b and interior battery 33 can be removed from the battery cavity 6 through the plug opening 14, as desired. Finally, after the exterior battery 34c and corresponding interior battery 33 have next been consumed, the housing cap 9 can be rotated to cause contact between the contact segment 21 and the positive pole 35 of the exterior battery 34d to illuminate the light bulb 32. After the exterior battery 34d and corresponding interior battery 33 are consumed, the expended batteries remaining in the system housing 2 are replaced. Accordingly, in the foregoing manner, the multiple battery pairs or sets can be sequentially expended or consumed to provide prolonged powering capability to the light bulb 32 without the need to obtain and install replacement batteries after consumption of each pair of batteries.

Referring next to FIG. 10, the system 1 may be fitted with a handle assembly 40 to facilitate carrying the system 1 and supporting the system 1 in a self-supporting position on a surface, as desired. The handle assembly 40 may include a top handle cradle 41 which is provided with a handle 43 and fits over the upper portion of the system housing 2 of the system 1. A bottom handle cradle 42 fits around the lower portion of the system housing 2 and is attached to the top handle cradle 41 typically using screws (not illustrated) or other fastening technique known by those skilled in the art. Accordingly, the handle 43 can be manually grasped to facilitate carrying the system 1. Alternatively, the system 1 can be supported in a self-standing configuration on a flat surface (not illustrated) by resting the bottom handle cradle 42 on the surface.

Referring next to FIGS. 11 and 12, in another embodiment the revolving battery reserve system 45 is adapted for electrical connection to a portable radio (not illustrated), lantern (not illustrated) or other electrical device or accessory to provide electrical power to the device or accessory in the same manner as heretofore described with respect to the light bulb 32 of the embodiment shown in FIGS. 1–4. The system 45 includes a positive contact peg 22 which extends from the extending end of the extension segment 20 of the positive contact rod 19. A negative contact ring 46 is provided in electrical contact with the battery extension springs 24 seated in the respective battery cavities 6 of the system housing 2. A negative contact peg 47 extends from the negative contact ring 46, typically in generally parallel relationship to the positive contact peg 22. Accordingly, wiring (not illustrated) or other suitable electrical conduit can be used to electrically connect the positive contact peg 22 and the negative contact peg 47 to the appropriate elements of the radio, lantern or other electrical device, according to the knowledge of those skilled in the art, to provide electrical power to the device in the same manner as heretofore described with respect to the light bulb 32 of the system 1. The multiple battery pairs or sets can be sequentially expended or consumed to provide prolonged powering capability to the device without the need to obtain and install replacement batteries between battery sets.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. A revolving battery reservoir system, comprising:
   a system housing for containing a plurality of sets of batteries and having a first end and a second end;
   a housing cap rotatably carried by said system housing at said first end;
   a contact rod carried by said housing cap and extending through said system housing to said second end for contacting a selected one of said plurality of sets of batteries responsive to rotation of said housing cap on said system housing;

a plurality of battery extension springs carried by said system housing for engaging said plurality of sets of batteries, respectively; and an electrical device provided on said system housing at said second end in electrical contact with said plurality of battery extension springs and said contact rod.

2. The system of claim 1 wherein said electrical device comprises a light bulb.

3. The system of claim 1 further comprising a plug opening provided in said housing cap and a battery plug removably closing said plug opening.

4. The system of claim 1 further comprising a plurality of battery depressions provided in said housing cap for receiving a plurality of batteries from said plurality of sets of batteries, respectively.

5. The system of claim 1 wherein said contact rod comprises an elongated extension segment and a contact segment extending from said extension segment and carried by said housing cap.

6. The system of claim 1 wherein said electrical device comprises a light bulb and further comprising a plug opening provided in said housing cap and a battery plug removably closing said plug opening.

7. The system of claim 6 further comprising a plurality of battery depressions provided in said housing cap for receiving a plurality of batteries from said plurality of sets of batteries, respectively.

8. The system of claim 7 wherein said contact rod comprises an elongated extension segment and a contact segment extending from said extension segment and carried by said housing cap, and wherein said contact segment is provided in one of said plurality of battery depressions.

9. A revolving battery reservoir system, comprising:
a system housing having a first end and a second end, a plurality of battery cavities for containing a plurality of sets of batteries, respectively, and a rod cavity extending from said first end to said second end between said plurality of battery cavities;
a housing cap rotatably carried by said system housing at said first end and having a cap body, a cap wall extending from said cap body for engaging said system housing and defining a cap interior, and a cap interior surface provided on said cap body in said cap interior;
a plurality of battery depressions provided in said cap interior surface;
a contact rod having a contact segment seated in one of said plurality of battery depressions for contacting a selected one of said plurality of sets of batteries responsive to rotation of said housing cap on said system housing and an extension segment extending from said contact segment through said rod cavity;
a plurality of battery extension springs provided in said plurality of battery cavities, respectively, for engaging said plurality of sets of batteries, respectively; and an electrical device provided on said system housing at said second end in electrical contact with said plurality of battery extension springs and said extension segment of said contact rod.

10. The system of claim 9 wherein said electrical device comprises a light bulb.

11. The system of claim 9 further comprising a plug opening extending through said cap body and a battery plug removably closing said plug opening.

12. The system of claim 11 further comprising a battery depression provided in said battery plug for receiving a plurality of batteries from said plurality of sets of batteries, respectively.

13. The system of claim 9 wherein said electrical device comprises a flashlight bulb housing carried by said system housing and a lightbulb provided in said flashlight bulb housing and provided in electrical contact with said plurality of battery extension springs and said extension segment of said contact rod.

14. A revolving battery reservoir system, comprising:
a system housing for containing a plurality of sets of batteries and having a first end and a second end;
a housing cap rotatably carried by said system housing at said first end;
a contact rod carried by said housing cap and extending through said system housing to said second end for contacting a selected one of said plurality of sets of batteries responsive to rotation of said housing cap on said system housing;
a plurality of battery extension springs carried by said system housing for engaging said plurality of sets of batteries, respectively;
an annular contact ring provided in electrical contact with said plurality of battery extension springs;
a first contact peg provided in electrical contact with said contact ring; and
a second contact peg provided in electrical contact with said contact rod and extending through said contact ring.

15. The system of claim 14 wherein said housing cap comprises a cap body, a cap wall extending from said cap body for engaging said system housing and defining a cap interior, and a cap interior surface provided on said cap body in said cap interior.

16. The system of claim 15 further comprising a plug opening extending through said cap body and a battery plug removably closing said plug opening.

17. The system of claim 16 further comprising a plurality of battery depressions provided in said cap interior surface and a battery depression provided in said battery plug for receiving a plurality of batteries from said plurality of sets of batteries, respectively.

* * * * *